(12) United States Patent
Ewe et al.

(10) Patent No.: US 8,289,922 B2
(45) Date of Patent: Oct. 16, 2012

(54) APPARATUS AND METHOD FOR HANDLING MOBILE TERMINAL CAPABILITY INFORMATION

(75) Inventors: Lutz Ewe, Stuttgart (DE); Rolf Sigle, Remshalden/Grunbach (DE)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 12/221,640

(22) Filed: Aug. 5, 2008

(65) Prior Publication Data

US 2009/0046596 A1 Feb. 19, 2009

(30) Foreign Application Priority Data

Aug. 14, 2007 (EP) ..................................... 07291013

(51) Int. Cl.
*H04W 4/00* (2009.01)
(52) U.S. Cl. ....................................... 370/331; 370/252
(58) Field of Classification Search .................. 370/331, 370/252
See application file for complete search history.

(56) References Cited

U.S. PATENT DOCUMENTS

| | | | | |
|---|---|---|---|---|
| 6,748,246 | B1 * | 6/2004 | Khullar ........................... | 455/574 |
| 7,860,520 | B2 * | 12/2010 | Jia et al. ........................ | 455/458 |
| 7,953,042 | B2 * | 5/2011 | Kwak et al. ................... | 370/331 |
| 8,023,491 | B2 * | 9/2011 | Gruber .......................... | 370/349 |
| 2003/0114158 | A1 * | 6/2003 | Soderbacka et al. .......... | 455/436 |
| 2007/0237126 | A1 * | 10/2007 | Pirila et al. ..................... | 370/349 |
| 2008/0182615 | A1 * | 7/2008 | Xue et al. .................... | 455/552.1 |
| 2009/0280815 | A1 * | 11/2009 | Roberts ......................... | 455/436 |
| 2010/0182955 | A1 * | 7/2010 | Bjork et al. ................... | 370/328 |

FOREIGN PATENT DOCUMENTS

| | | |
|---|---|---|
| EP | 07 29 1013 | 12/2007 |
| GB | 2 423 215 | 8/2006 |
| WO | WO 2005/004507 | 1/2005 |
| WO | WO 2007/036796 | 4/2007 |

* cited by examiner

*Primary Examiner* — Ricky Ngo
*Assistant Examiner* — Ben H Liu
(74) *Attorney, Agent, or Firm* — Fay Sharpe LLP

(57) ABSTRACT

A mobile terminal is attached to a first network of a first technology type RAT1. The mobile terminal transmits UE capability information to the first network by a plurality of containers. Each container relates to one type of technology which is supported by the mobile terminal. Each container includes an indicator tag identifying the RAT to which its contents relate. On receipt of the containers, the first network decodes the content of the container that is indicated to be of its own technology type. If there is a neighbouring network of another technology type with which the mobile terminal is compatible, the first network sends the relevant container to the second network, where its content is decoded. The second network may return generalized information derived from the container back to the first network. This mechanism provides a content-agnostic approach for transferring mobile capability information between networks of different technology types.

27 Claims, 1 Drawing Sheet

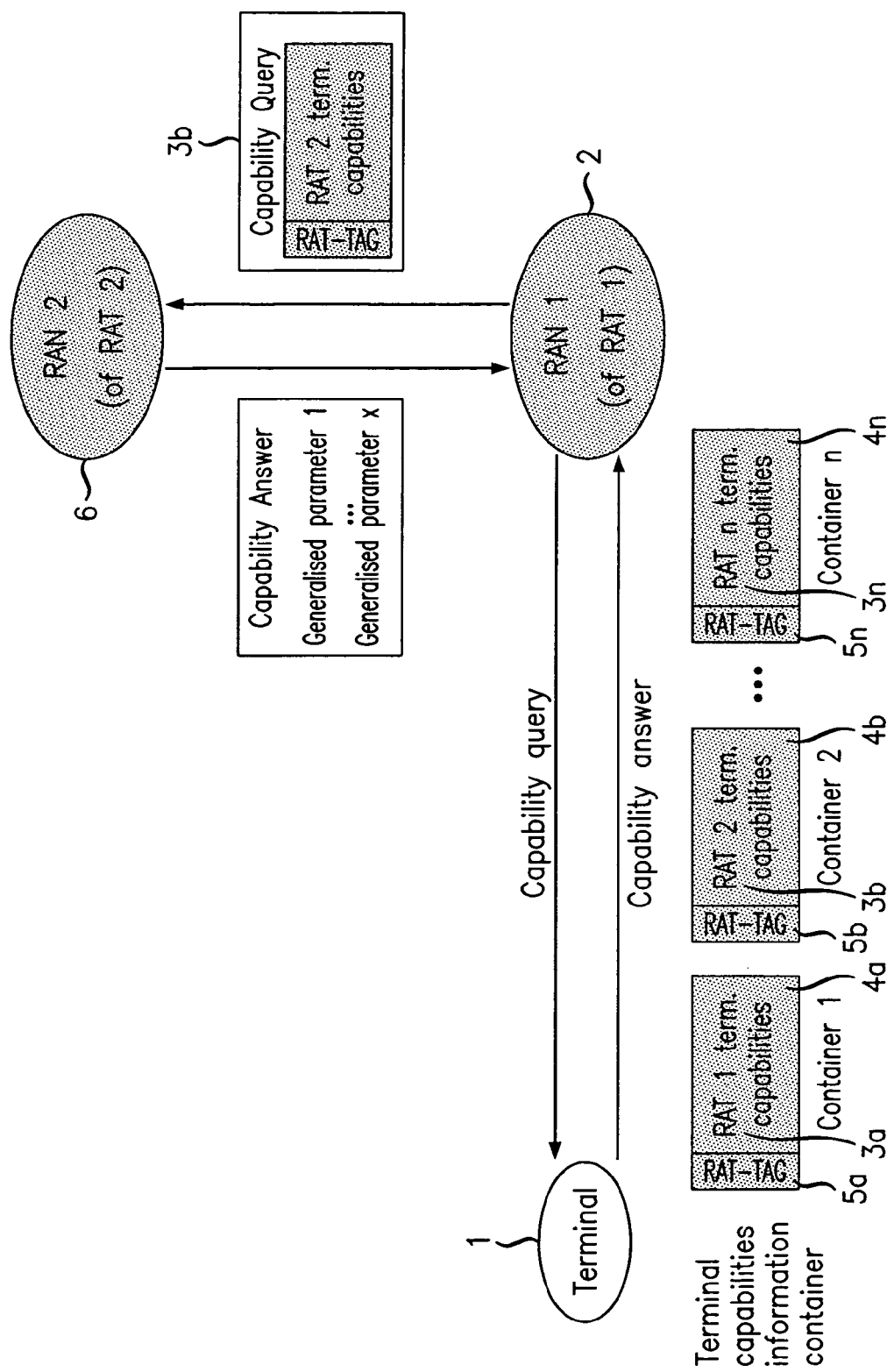

APPARATUS AND METHOD FOR HANDLING MOBILE TERMINAL CAPABILITY INFORMATION

FIELD OF THE INVENTION

The present invention relates to an apparatus and method for handling mobile terminal capability information, and is particularly, but not exclusively, applicable where a mobile terminal is in an environment comprising networks of different radio access technology types.

BACKGROUND OF THE INVENTION

Radio access networks (RANs) using different radio access technologies (RATs) are being deployed, and proposed for deployment, in overlapping configurations, leading to an increasingly heterogeneous mobile radio system infrastructure in urban, and even rural, areas. Potentially, this provides a choice of network type to mobile terminals with multi-RAT capabilities. Network operators have identified benefits from simultaneous and alternating usage by interworking between different technologies.

Typically, during development of a new radio access technology, its interoperability with other already available, or future, RATs tends not to be addressed to any great extent until the technology type is reasonably well-defined following adoption of the main proposals. One interoperability aspect relates to notifying a RAN as to which technologies are supported by a mobile radio terminal, sometimes termed a user equipment (UE), and related information ("UE capability information"). To achieve interworking between different RATs, a network node must be able to handle and interpret UE capability information relating to several different technologies and presented in different formats.

A contribution by Ericsson to 3GPP TSG-RAN WG2 #57-bis R2-071328, incorporated herein by way of reference, provides a summary of UE capabilities in Universal Mobile Telecommunications System (UMTS) and related capabilities for Long Term Evolution (LTE). UE capability may include, for example, PDCP capability (such as the type of header compression supported), RLC capability (maximum RLC AM window size, max number of AM entities, etc.), Transport channel capability (max number of channels, received bits, RF capability FDD/TDD (supported bands, UE power class, Tx/Rx frequency separation), Physical channel capability (max number of codes, SF, received bits), UE multi-mode/multi-RAT capability (support of GSM, multi-carrier), Security capability (ciphering/integrity algorithm supported), Measurement capability (need for compress mode for GSM, multi-carrier measurements) and UE positioning capability. UE capability also includes inter-RAT UE radio access capability, such as GSM and GERAN capabilities. 3GPP standard TS 25.331 "RRC Protocol Specification", incorporated herein by way of reference, also lists UE capability information.

UMTS, one of the 3GPP family of RATs, allows for an explicit query of the capability of a UE. A radio controller (RNC) sends a "UE capability enquiry" message, via the NodeB (eNB), to the UE and receives in response a "UE capability information" message from the UE. The RNC acknowledges reception of the UE capability information message by sending a final "UE capability information confirm" message to the UE. If the capabilities of a UE change during the network attachment, the UE can indicate this to the RNC by sending an unsolicited "UE capability information" message to the RNC, which acknowledges its reception again with a "UE capability information confirm" message. Thus, a capability information transfer may be initiated by the UE or the RNC depending on the circumstances.

In addition to an explicit enquiry of capability information, the UE capability information may be included as a part of several messages within different signalling procedures, as an information element (IE). During the radio resources control (RRC) connection establishment procedure, for instance, the UE capabilities are included in the final "RRC connection setup complete" message, which is sent from the UE to the RNC.

It may be necessary for the serving RNC, to which the UE is attached, to perform handover to a RAN of a different RAT. Handover between different RATs is termed a "vertical handover". For example, a RNC in a UMTS network might handover to a base station controller (BSC) in a GSM network. If the UE capability information of a UE is already available in the serving RNC, the UE capability information is included in a particular message during the handover signalling in the network. The structure of the UE capability information in the particular message is specified, taking into account the two types of RAT involved. Where other types of RAT are involved, a different structure may be specified.

For RATs other than those described above, similar procedures are involved, with UE capability information being handled as laid down in RAT-specific procedures to permit interworking.

BRIEF SUMMARY

According to a first aspect of the invention, a method for handling mobile terminal capability information includes the steps of: a mobile terminal sending to a first network a container that includes content comprising information relevant to its capability for communication with a network of a particular type and an indicator indicating that particular type; the first network receiving the container and, when the indicator indicates that the first network is of the particular type, decoding the content of the container, and, when the indicator indicates that the first network is not of the particular type, not decoding the content.

Use of a method in accordance with the invention allows generalized handling of UE capability information. The first network only needs to decode mobile terminal capability information relating to its own technology, and is not required to decode information specific to other types of technology. Also, although the information may be formatted in a technology-specific structure, the first network only needs to decode information structured in accordance with its own technology. Accordingly, there is no need for the information structures of other technology types to be specified at the first network. This facilitates and simplifies standardization aspects. This is in contrast to previous proposals for interworking between RANs, where a specific message structure must be specified and is RAT-specific. Content-agnostic handling of mobile terminal capability information using the inventive method may thus lead to improved interworking between different RATs. The method may be applied to existing RATs, those currently in development and future RATs.

The UE capability information is used in different ways by a network. Concerning handovers in 3GPP, the radio controller configures and initiates UE measurements. These are either just intra-RAT ones, instructing the particular UE for a scanning of neighbouring cells of the same technology, or—if the UE has indicated by its transmitted UE capabilities that it's a multi-RAT capable one—inter-RAT measurements, in which the UE also scans for neighbouring cells of a different technology The invention may be applied to radio access technology networks, such as 3GPP RATs (UMTS, GSM, LTE), 3GPP2 (CDMA2000, HRPD), and also to other types of network such as IEEE 802.xy (WiMAX, WLAN) for example, or fixed-mobile interworking, for example.

In another method in accordance with the invention, when there is a neighbouring second network of the particular type, the first network stores the container, without decoding the content, for potential future use by the second network. The storage may be temporary, to facilitate messaging between the first and second networks, or held on a more long-term basis, if there is sufficient storage space, so that if, for example, handover is contemplated at a future time, the first network already has the UE capability information available to transmit to the second network. In other inventive aspects, the container may be immediately transmitted to the second network by the first network. The mobile terminal capability information may be used for other operations of the network than handover.

In another method in accordance with the invention, the first network transfers the container to the second network which decodes the content and information derived from the content is transmitted by the second network to the first network for use by the first network. This consultation mechanism between networks of different technology types provides a way to gain information in a generalized format about the content of a received container of a different technology. The generalized format is one in which information is not represented in a specific format depending on the technology type but is represented identically for different technologies, for those technologies that are supported. The returned generalized information from the second network to the first network may be used to support decisions performed by a serving network element of the first network, for example. The generalized returned information may concern supported frequencies and ranges. For example, for GSM, the frequency ranges could encompass 850/900/1800/1900 MHz. A handover to a GSM network requires the correct supported range and may fail, for example, where an American 850/1900 MHz mobile terminal travels between regions with GSM networks operating in different frequency ranges, such as North America and Europe. Where the first network to which the mobile terminal is attached is a non-GSM network, the generalized information from a neighbouring GSM second network may provide the supported frequency ranges for GSM operation. This enables the first network to determine if handover is possible to the neighbouring GSM second network. A returned supported gross bandwidth for a different technology can support the decision as to whether an on-going streaming service could be continued in a neighbouring network of that technology. The returned information may be related to support for the capability of simultaneously active transceivers of different technologies, for example, in a mobile phone or an appropriately equipped laptop, to support the decision for a make-before-break or a break-before-make handover decision.

According to a second aspect of the invention, a mobile terminal comprises a generator for producing a container including content comprising information relevant to its capability for communication with a network of a particular type and an indicator indicating that particular type. The generator may produce a plurality of different containers for respective different capabilities of the mobile terminal.

According to a third aspect of the invention, a communication network operates in accordance with a method in accordance with the invention.

BRIEF DESCRIPTION OF THE DRAWINGS

An embodiment and method in accordance with the present invention are described by way of example with reference to the accompanying drawings, in which:

FIG. 1 schematically illustrates a communication system including two networks of different technology types.

DETAILED DESCRIPTION

With reference to FIG. 1, a mobile terminal 1, which in this case is a mobile phone, is attached to a serving RNC in a first network 2, shown as RAN1 operating under a first RAT, RAT1. In this embodiment, the RAN1 is a UTRAN network in accordance with UMTS. The first network 2 sends a capability query to the mobile terminal 1. The mobile terminal 1 includes a generator which outputs a plurality of containers $3a, 3b \ldots 3n$ in response to the query. Each container relates to a type of technology with which the mobile terminal 1 is compatible, so where the mobile terminal 1 is multi-RAT capable, as in this case, a plurality of containers is sent to the RAN1 2. Each container $3a, 3b \ldots 3n$ includes content giving UE capability information relating to a particular RAT, shown as $4a, 4b \ldots 4n$ respectively. Each container $3a, 3b \ldots 3n$ also has an indicator tag $5a, 5b \ldots 5n$ respectively, which indicates with which RAT the content is associated. A container is thus generated by the mobile terminal 1 for each supported radio technology containing its capability parameters. While the actual content is only defined by the particular RAT standard the head of the container is equipped with a tag that is unique for and identical in each radio technology. Where the mobile terminal 1 handles different types of data transmissions in different ways, this may be reflected in the container contents and tags. For example, for inter-RAT load management, data transmission may be handled by one RAT and voice transmission using another RAT.

On receipt of the containers $3a, 3b \ldots 3n$, the first network 2 decodes each of the tags $5a, 5b \ldots 5n$. On determining that the first container $3a$ is relevant to RAT1 technology, which is the technology type of the first network, its contents $4a$ are also decoded and used appropriately by the first network 2. The second container $3b$ relates to a different technology type, RAT2, which in this embodiment is GSM technology. Thus, the first network 2 leaves the content of container $3b$ in coded form and checks if there is any neighbouring network of the second technology type. If there is no such neighbouring network, then the container is discarded. However, in this arrangement, a neighbouring GSM second network 6 exists, being shown as RAN2. The first network 1 may forward the second container $3b$ to the second network 6 if handover is imminent, or if it is required to obtain generalized information derived from the content of the second container $3b$. The receiving second network 6 checks the tag $5b$ for an indication of its own technology and decodes the associated content $4b$ of the container and may return information from it in a generalized format back to the first network 2.

Following a successful handover to the second network 6, the container information about the UE capability can be kept in the second network 6 for later decisions concerning radio resource or mobility control, such as further handovers, which can avoid a need for an explicit inquiry of the UE capabilities of the now serving RAN2.

If there is no immediate requirement for the container 3b to be sent by the first network 2 to the second network 6, it is stored at the first network 2 if sufficient storage capacity exists, but otherwise it may be discarded. However, if it is discarded, it may be necessary at a later time to repeat the messaging to obtain again the capability information from the mobile terminal 1.

If content of the container 3b might be relevant in the currently serving RAN1 where the UE is attached to the first network 2, the neighbouring RAN2 of the particular technology is consulted. The consulting mechanism comprises in a query/answer message procedure. The query message contains the undecoded container and an optional indication of the demanded information for the returned answer message. The receiving RAN of the appropriate technology (indicated by the RAT-tag of the container) decodes its content and returns an answer message containing a generalized representation of the queried information. The generalized information may, for example, consist of supported bandwidths for radio transmission or supported mobile positioning systems. For the implementation of a consulting mechanism, only a format of the returned generalized information, such as the ability of GPS reception, or a maximum or expected transmission bandwidth (e.g. for QoS-related handover decisions) must be defined.

As regards backward compatibility aspects, a simple Boolean flag may indicate the support for the inventive method. Where an answering UE does not support the method, it operates according to the previous mechanisms. As to forward compatibility, by adopting the inventive method, there is a significantly reduced need for further standardization efforts concerning UE capabilities where additional supported radio technologies for inter-system handover exist. As decoding of container content is only performed within its particular related technology, no extensive inter-technology-coordination on the level of the standardization bodies is required.

The present invention may be embodied in other specific forms, and performed using different methods, without departing from its spirit or essential characteristics. The described embodiments and methods are to be considered in all respects only as illustrative and not restrictive. The scope of the invention is, therefore, indicated by the appended claims rather than by the foregoing description. All changes that come within the meaning and range of equivalency of the claims are to be embraced within their scope.

The invention claimed is:

1. A method for handling mobile terminal capability information, including:
    receiving a capability message with at least one container from a mobile terminal at a first network, each container including content comprising capability information relevant to capabilities of the mobile terminal for communication using a particular Radio Access Technology (RAT) and a head comprising an indicator uniquely identifying said particular RAT associated with the capability information in the corresponding container in relation to other RATs;
    reading the indicator associated with a first container of the capability message;
    determining the capability information in the first container is relevant to a first RAT based on the read indicator;
    when the first network is not capable of communicating with the mobile terminal using said first RAT, sending a query message with the first container to a second network neighboring the first network, the second network being capable of communicating with the mobile terminal using the first RAT; and
    receiving an answer message from the second network at the first network in response to the query message, the answer message including at least a portion of the capability information from the first container in a generalized format, wherein the capability information in the generalized format was derived by the second network after decoding the capability information in the first container, wherein the capability information received from the second network in the answer message is available to the first network to support decisions in conjunction with serving the mobile terminal.

2. The method as claimed in claim 1, further comprising:
    reading the indicator associated with a second container of the capability message;
    determining the capability information in the second container is relevant to a second RAT based on the read indicator; and
    when the first network is not capable of communicating with the mobile terminal using said second RAT, at least temporarily storing the second container for potential future use by a third network neighboring the first network, the third network being capable of communicating with the mobile terminal using the second RAT.

3. The method as claimed in claim 2 wherein the first network transfers the second container to the third network when handover of the mobile terminal from the first network to the third network is imminent.

4. The method as claimed in claim 1 wherein the generalized format of the capability information in the answer message is independent of RAT such that networks using RATs other than the first RAT can make use of the corresponding capability information.

5. A wireless communication network serving a mobile terminal, comprising:
    a receiver configured to receive a capability message with at least one container from a mobile terminal, each container including content comprising capability information relevant to capabilities of the mobile terminal for communication using a particular radio access technology (RAT) and a head comprising an indicator uniquely identifying the particular RAT associated with the capability information in the corresponding container in relation to other RATs;
    a reader configured to read the indicator associated with a first container of the capability message;
    a network communication module configured to communicate with other networks; and
    a processor configured to determine the capability information in the first container is relevant to a first RAT based on the read indicator, to determine if the first network is capable of communicating with the mobile terminal using the first RAT, and, when the first network is not capable of communicating with the mobile terminal using the first RAT, to determine if a neighboring network is capable of communicating with the mobile terminal using the first RAT;
    wherein, when the first network is not capable of communicating with the mobile terminal using the first RAT and a neighboring network is capable, the processor is configured send a query message with the first container to the neighboring network via the network communication module;
    wherein the network communication module is configured to receive an answer message from the neighboring network in response to the query message, the answer message including at least a portion of the capability information from the first container in a generalized format, wherein the capability information in the generalized format was derived by the neighboring network after decoding the capability information in the first container, wherein the capability information received from the neighboring network in the answer message is available to the wireless communication network to support decisions in conjunction with serving the mobile terminal.

6. The method of claim 1, further comprising:
when the first network is capable of communicating with the mobile terminal using the first RAT, decoding the capability information associated with the first container at the first network, wherein the decoded capability information from the first container is available to the first network to support decisions in conjunction with serving the mobile terminal.

7. The method of claim 1, further comprising:
reading the indicator associated with a second container of the capability message;
determining the capability information in the second container is relevant to a second RAT based on the read indicator; and
when the first network is capable of communicating with the mobile terminal using the second RAT, decoding the capability information associated with the second container at the first network, wherein the decoded capability information from the second container is available to the first network to support decisions in conjunction with serving the mobile terminal.

8. The method of claim 1 wherein the capability information received from the second network in the answer message includes at least one of support for GPS reception by the mobile terminal, maximum transmission bandwidth support by the mobile terminal, expected transmission bandwidth supported by the mobile terminal, frequencies supported by the mobile terminal, frequency ranges supported by the mobile terminal, gross bandwidth supported by the mobile terminal, and support for simultaneously active transceivers of different RATs by the mobile terminal.

9. The method of claim 1, further comprising:
sending a capability query to the mobile terminal from the first network requesting capabilities of the mobile terminal for communications using RATs, wherein the capability message received from the mobile terminal was generated by the mobile terminal in response to receiving the capability query.

10. The method of claim 1, further comprising:
reading the indicator associated with a second container of the capability message;
determining the capability information in the second container is relevant to a second RAT based on the read indicator; and
when the first network is not capable of communicating with the mobile terminal using the second RAT, checking if there is another network neighboring the first network is capable of communicating with the mobile terminal using the first RAT.

11. The method of claim 10, further comprising:
when there is not another network neighboring the first network that is capable of communicating with the mobile terminal using the first RAT, discarding the second container.

12. The method of claim 10, further comprising:
when there is another network neighboring the first network that is capable of communicating with the mobile terminal using the first RAT, sending a consulting query message with the second container to the corresponding neighboring network.

13. The method of claim 10, further comprising:
when there is another network neighboring the first network that is capable of communicating with the mobile terminal using the first RAT, at least temporarily storing the second container for potential future use by the corresponding neighboring network.

14. The wireless communication network of claim 5, further comprising
a storage device;
wherein the reader is configured to read the indicator associated with a second container of the capability message;
wherein the processor is configured to determine the capability information in the second container is relevant to a second RAT based on the read indicator, to determine if the wireless communication network is capable of communicating with the mobile terminal using the second RAT, and, when the wireless communication network is not capable of communicating with the mobile terminal using the second RAT, to determine if a neighboring network is capable of communicating with the mobile terminal using the second RAT; and
wherein, when the wireless communication network is not capable of communicating with the mobile terminal using the second RAT and a neighboring network is capable, the processor is configured to at least temporarily store the second container in the storage device for potential future use by the neighboring network.

15. The wireless communication network of claim 5 wherein the generalized format of the capability information in the answer message is independent of RAT such that networks using RATs other than the first RAT can make use of the corresponding capability information.

16. The wireless communication network of claim 5, further comprising:
a decoder configured to decode the capability information associated with the first container when the wireless communication network is capable of communicating with the mobile terminal using the first RAT, wherein the decoded capability information from the first container is available to the wireless communication network to support decisions in conjunction with serving the mobile terminal.

17. The wireless communication network of claim 5, further comprising:
a transmitter configured to send a capability query to the mobile terminal requesting capabilities of the mobile terminal for communications using RATs, wherein the capability message received from the mobile terminal by the receiver was generated by the mobile terminal in response to receiving the capability query.

18. A method for handling mobile terminal capability information, comprising:
receiving a first message with a first container from a first network serving a mobile terminal at a second network neighboring the first network, the first container including content comprising capability information relevant to capabilities of the mobile terminal for communication using a first Radio Access Technology (RAT), wherein the second network is capable of communicating with the mobile terminal using the first RAT and the first network is not capable;

decoding the capability information associated with the first container at the second network, wherein the decoded capability information from the first container is available to the second network to support decisions associated with potential future service to the mobile terminal; and sending an answer to the first network in response to the first message, the answer including at least a portion of the capability information from the first container in a generalized format, wherein the capability information in the generalized format was derived by the second network after decoding the capability information in the first container, wherein the capability information sent by the second network in the answer is available to the first network after receiving the answer to support decisions in conjunction with serving the mobile terminal.

19. The method of claim 18, further comprising:

receiving a second message with a second container from the first network serving a mobile terminal at the second network neighboring the first network, the second container including content comprising capability information relevant to capabilities of the mobile terminal for communication using the first Radio Access Technology (RAT), wherein the first network was at least temporarily storing the second container for potential future use by the second network.

20. The method of claim 19 wherein the second network receives the second container from the first network when handover of the mobile terminal from the first network to the second network is imminent.

21. The method of claim 18 wherein the generalized format of the capability information in the answer message is independent of RAT such that networks using RATs other than the first RAT can make use of the corresponding capability information.

22. The method of claim 18 wherein the capability information sent to the first network in the answer includes at least one of support for GPS reception by the mobile terminal, maximum transmission bandwidth support by the mobile terminal, expected transmission bandwidth supported by the mobile terminal, frequencies supported by the mobile terminal, frequency ranges supported by the mobile terminal, gross bandwidth supported by the mobile terminal, and support for simultaneously active transceivers of different RATs by the mobile terminal.

23. A neighboring network in relation to serving network, the neighboring network comprising:

a receiver configured to receive a first message with a first container from a serving network serving a mobile terminal, the neighboring network neighboring the serving network, the first container including content comprising capability information relevant to capabilities of the mobile terminal for communication using a first Radio Access Technology (RAT), wherein the neighboring network is capable of communicating with the mobile terminal using the first RAT and the serving network is not capable;

a decoder configured to decode the capability information associated with the first container, wherein the decoded capability information from the first container is available to the neighboring network to support decisions associated with potential future service to the mobile terminal; and a transmitter configured to send an answer to the serving network in response to the first message, the answer including at least a portion of the capability information from the first container in a generalized format, wherein the capability information in the generalized format was derived by the second network after decoding the capability information in the first container, wherein the capability information sent by the second network in the answer is available to the first network after receiving the answer to support decisions in conjunction with serving the mobile terminal.

24. The neighboring network of claim 23, further comprising:

receiving a second message with a second container from the first network serving a mobile terminal at the second network neighboring the first network, the second container including content comprising capability information relevant to capabilities of the mobile terminal for communication using the first Radio Access Technology (RAT), wherein the serving network was at least temporarily storing the second container for potential future use by the neighboring network.

25. The neighboring network of claim 24 wherein the neighboring network receives the second container from the serving network when handover of the mobile terminal from the serving network to the neighboring network is imminent.

26. The neighboring network of claim 23 wherein the generalized format of the capability information in the answer message is independent of RAT such that networks using RATs other than the first RAT can make use of the corresponding capability information.

27. The neighboring network of claim 23 wherein the capability information sent to the serving network in the answer includes at least one of support for GPS reception by the mobile terminal, maximum transmission bandwidth support by the mobile terminal, expected transmission bandwidth supported by the mobile terminal, frequencies supported by the mobile terminal, frequency ranges supported by the mobile terminal, gross bandwidth supported by the mobile terminal, and support for simultaneously active transceivers of different RATs by the mobile terminal.

* * * * *